United States Patent [19]

Gelinas

[11] Patent Number: 4,605,897
[45] Date of Patent: Aug. 12, 1986

[54] APPARATUS AND METHOD FOR DISTANCE DETERMINATION BETWEEN A RECEIVING DEVICE AND A TRANSMITTING DEVICE UTILIZING A CURL-FREE MAGNETIC VECTOR POTENTIAL FIELD

[75] Inventor: Raymond C. Gelinas, Concord, Mass.

[73] Assignee: Honeywell Inc., Minneapolis, Minn.

[21] Appl. No.: 579,846

[22] Filed: Feb. 13, 1984

Related U.S. Application Data

[63] Continuation of Ser. No. 198,326, Oct. 20, 1980, abandoned.

[51] Int. Cl.$^4$ .................. G01B 7/14; G01R 35/00; G01R 33/00
[52] U.S. Cl. .................................. 324/207; 324/202; 324/260
[58] Field of Search ............... 324/207, 208, 244, 248, 324/260, 262, 202

[56] References Cited

U.S. PATENT DOCUMENTS 3,733,526  5/1973  Anacher et al. ............... 317/234 R

OTHER PUBLICATIONS

Jaklevic et al, "Macroscopic Quantum Interference in Superconductors", Physical Review, vol. 140, No. 5A, pp. 1628-1637, 11/1961.
Aharonov et al, "Significance of Electromagnetic Potentials in the Quantum Theory", Physical Review, vol. 115, No. 3, pp. 485-491, 8/1959.
Aharonov et al, "Further Considerations on Electromagnetic Potentials in the Quantum Theory", Physical Review, vol. 123, No. 4, pp. 1511-1524, 8/1961.
Josephson, "Coupled Superconductors", Review of Modern Physics, 1/1964, pp. 216-220.
Feynman et al, "The Feynman Lectures on Physics", Addison-Wesley, Reading, Mass., pp. 15-6 to 15-14 and 21-1 to 21-19.
McCall et al, "A Linear Position Transducer . . . ", IEEE Transactions on Instrumation and Measurement, vol. IM26, No. 2, 6/1977.

Primary Examiner—Ernest F. Karlsen
Assistant Examiner—Walter E. Snow
Attorney, Agent, or Firm—William W. Holloway; John S. Solakian

[57] ABSTRACT

A method for measurement of distance using the curl-free vector potential radiation field. The system includes current-carrying apparatus for generating a predominantly curl-free vector potential field and apparatus for modulating the current applied to the generating apparatus. The receiving apparatus includes a detecting apparatus with observable properties that vary with the application of an applied curl-free vector potential field, a demodulation apparatus for determining the magnitude of the curl-free vector potential field. The magnitude of the detected curl-free magnetic vector potential field can determine the distance from apparatus generating predetermined periodic changes in the curl-free vector potential field. The vector potential field can be established in conducting and opaque materials which are not capable of transmitting typical electromagnetic radiation.

9 Claims, 10 Drawing Figures

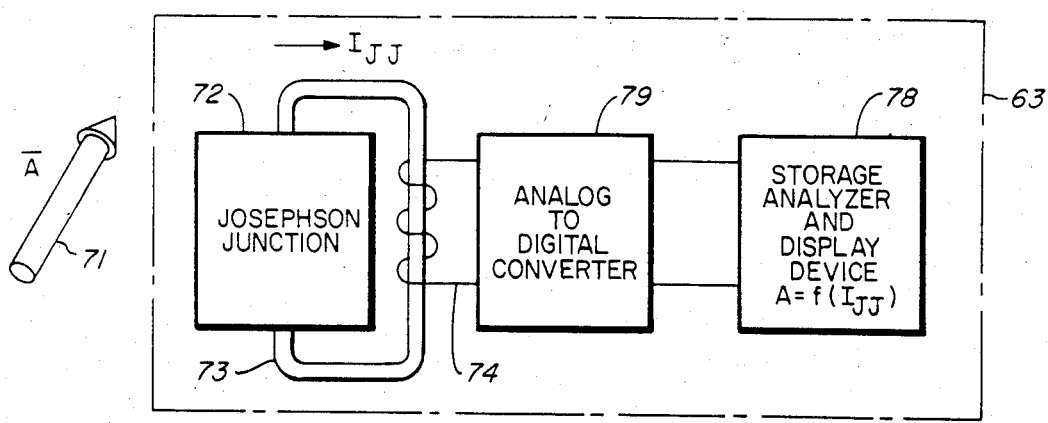
_FIG-7_
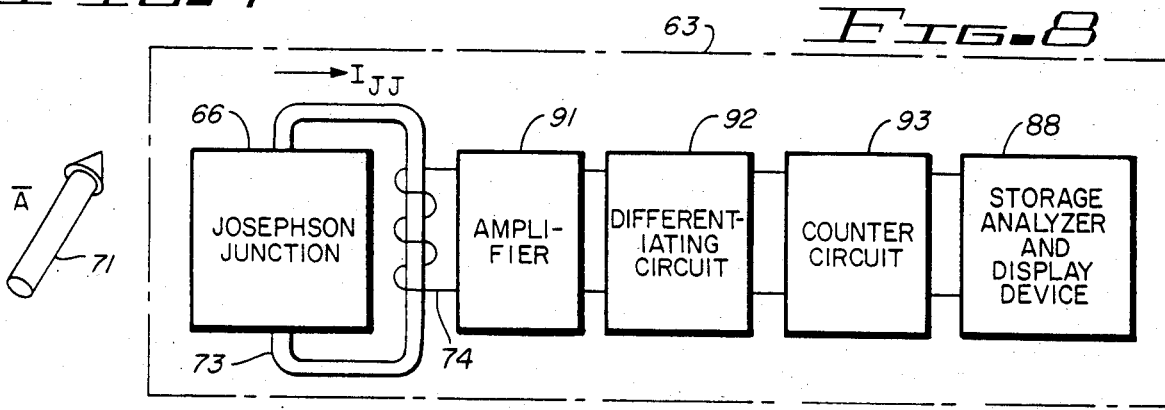
_FIG-8_
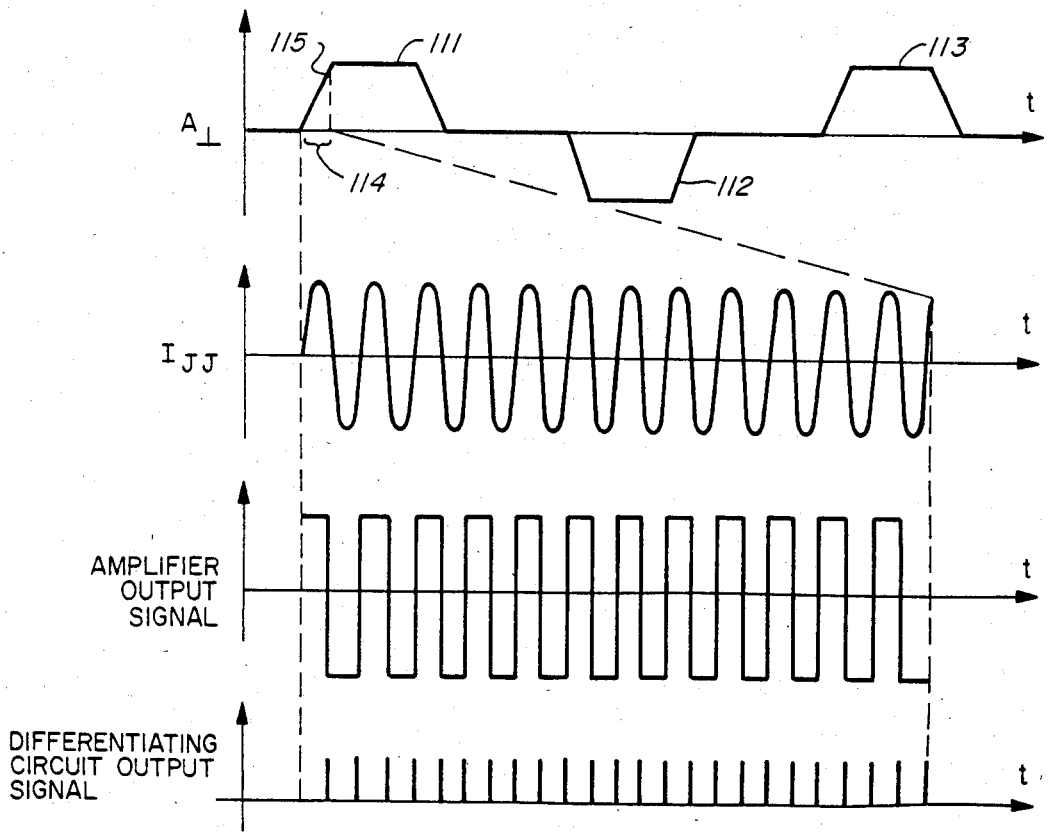
_FIG-9_

APPARATUS AND METHOD FOR DISTANCE DETERMINATION BETWEEN A RECEIVING DEVICE AND A TRANSMITTING DEVICE UTILIZING A CURL-FREE MAGNETIC VECTOR POTENTIAL FIELD

This is a continuation of application Ser. No. 198,326 filed Oct. 20, 1980 now abandoned.

RELATED U.S. PATENTS

Apparatus and Method for Transfer of Information by Means of a Curl-Free Magnetic Vector Potential Field invented by Raymond C. Gelinas, U.S. Pat. No. 4,432,098 and assigned to the same assignee as named herein.

Apparatus and Method for Direction Determination by Means of a Curl-free Magnetic Vector Potential Field, invented by Raymond C. Gelinas, U.S. Pat. No. 4,447,779 and assigned to the same assignee as named herein.

Apparatus and Method for Demodulation of a Modulated Curl-Free Magnetic Vector Potential Field, invented by Raymond C. Gelinas, U.S. Pat. No. 4,429,280, and assigned to the same assignee as named herein.

Apparatus and Method for Modulation of a Curl-Free Magnetic Vector Potential Field, invented by Raymond C. Gelinas, U.S. Pat. No. 4,429,288 and assigned to the same assignee as named herein.

BACKGROUND OF THE INVENTION

1. Field of the Invention

This invention relates generally to the measurement of distance by means of an electromagnetic field and more particularly to the measurement of distance by means of a component of a vector potential magnetic field A for which the CURL $\overline{A}=0$.

2. Description of the Prior Art

It is known in the prior art to provide a distance measurement system by generating an electromagnetic radiation field from a transmitter and measuring the time for the radiation field to reach the target object and return to a receiver. Because electromagnetic radiation travels with the speed of light, the time between transmission of the radiation and the detection of the reflected radiation by the receiver, (the receiver having a known spatial relationship with the transmitter) defines the distance. Familiar examples include microwave band ranging and optical (i.e., laser) reflection techniques. This technique for measuring distance is limited by the opacity of the intervening media to the transmitted electromagnetic radiation.

The Maxwell equations, which govern the prior art distance measuring techniques by electromagnetic fields can be written:

$$CURL\ \overline{E} + \frac{\partial \overline{B}}{\partial t} = 0 \qquad 1.$$

$$CURL\ \overline{H} - \frac{\partial \overline{D}}{\partial t} = \overline{J} \qquad 2.$$

$$DIV\ \overline{B} = 0 \qquad 3.$$

$$DIV\ \overline{D} = \rho \qquad 4.$$

where $\overline{E}$ is the electric field density, $\overline{H}$ is the magnetic field intensity, $\overline{B}$ is the magnetic flux density, $\overline{D}$ is the electric displacement, $\overline{J}$ is the current density and $\rho$ is the change density. In this notation the bar over a quantity indicates that this is a vector quantity, i.e., a quantity for which a spatial orientation is required for complete specification. The terms CURL and DIV refer to the CURL and DIVERGENCE mathematical operations and are denoted symbolically by the $\nabla \times$ and $\nabla \cdot$ mathematical operators respectively. Furthermore, the magnetic field intensity and the magnetic flux density are related by the equations $\overline{B}=\omega\overline{H}$, while the electric field density and the electric displacement are related by the equation $\overline{D}=\epsilon\overline{H}$. These equations can be used to describe the transmission of electromagnetic radiation through a vacuum or through various media.

It is known in the prior art that solutions to Maxwell's equations can be obtained through the use of electric scalar potential functions and magnetic vector potential functions. The electric scalar potential is given by the expression:

$$\phi(1) = \frac{1}{4\pi\epsilon_o} \int \frac{\rho(2)}{r_{12}} dv(2) \qquad 5.$$

where $\phi(1)$ is the scalar potential at point 1, $\rho(2)$ is the charge density at point 2, $r_{12}$ is the distance between point 1 and 2, and the integral is taken over all differential volumes dv(2). The magnetic vector potential is given by the expression:

$$\overline{A}(1) = \frac{1}{4\pi\epsilon_o C^2} \int \frac{\overline{J}(2)}{r_{12}} dv(2) \qquad 6.$$

where A(1) is the vector potential at point 1, $\epsilon_o$ is the permittivity of free space, C is the velocity of light, $\overline{J}(2)$ is the (vector) current density at point 2, $r_{12}$ is the distance between point 1 and point 2 and the integral is taken over all differential volumes. The potential functions are related to Maxwell's equations in the following manner:

$$\overline{E} = -GRAD\ \phi - \frac{\partial \overline{A}}{\partial t} \qquad 7.$$

where GRAD is the GRADIENT mathematical operation and is denoted by the $\nabla$ mathematical operator.

$$\overline{B} = CURL\ \overline{A} \qquad 8.$$

where $\overline{A}$ can contain, for completeness, a term which is the gradient of a scalar function. In the remaining discussion, the scalar function and the electric scalar field will be taken to be substantially zero. Therefore, attention will be focused on the magnetic vector potential $\overline{A}$.

In the prior art literature, consideration has been given to the physical significance of the magnetic vector potential field $\overline{A}$. The magnetic vector potential field was, in some instances, believed to be a mathematical artifice, useful in solving problems, but devoid of independent physical significance.

More recently, however, the magnetic vector potential has been shown to be a quantity of independent physical significance. For example, in quantum mechanics, the Schroedinger equation for a (non-relativistic, spinless) particle with charge g and mass m moving in an electromagnetic field is given by $$\frac{-\hbar}{i} \frac{\partial \psi}{\partial t} = \frac{1}{2m} \left( \frac{\hbar}{i} \text{GRAD} - g\overline{A} \right) \left( \frac{\hbar}{i} \text{GRAD} - g\overline{A} \right) \psi + g\phi\psi \qquad 9.$$

where h is Plank's constant divided by $2\pi$, i is the imaginary number $\sqrt{-1}$, $\phi$ is the electric scalar potential experienced by the particle, A is the magnetic scalar potential experienced by the particle and $\psi$ is the wave function of the particle. The ability of quantum mechanical systems to be influenced by the magnetic vector potential field has resulted in devices which can be used to detect the magnetic vector potential field.

OBJECTS OF THE INVENTION

It is therefore an object of the present invention to provide an improved system for the measurement of distance by means of an electromagnetic radiation field.

It is a further object of the present invention to provide a system for measurement of distance that can operate through media opaque to more usual electromagnetic radiation fields.

It is yet another object of the present invention to provide a system for measurement of distance by means of a curl-free magnetic vector potential field.

It is a more particular object of the present invention to provide apparatus for generation of a curl-free magnetic vector potential field and apparatus for detection of curl-free magnetic vector potential fields, the strength of the field at the detection apparatus being a measure of the distance.

SUMMARY OF THE INVENTION

The aforementioned and other objects are accomplished, according to the present invention, by apparatus for generating a magnetic vector potential field $\overline{A}$ having a substantial component subject to the condition CURL $\overline{A}$=0 (i.e., a curl-free magnetic vector potential field component), and by apparatus for detecting the curl-free magnetic vector potential field. The magnetic vector potential field generating apparatus generates a field having predetermined components. The detection apparatus determines the magnitude of the components. Because the steady-state curl-free component of the magnetic vector potential field has limited interaction with the intervening media, the magnitude of the detected curl-free magnetic vector potential is determined by the magnitude of curl-free magnetic vector potential field produced by the generating apparatus and the distance between generating apparatus and detection apparatus. Because the media does interact with a changing curl-free vector potential field, an upper limit to the frequency components of the applied field is imposed.

Examples of the apparatus generating magnetic vector potential fields with substantial curl-free components include solenoid configurations and toroidal configurations. The Josephson junction device is an example of a device which can detect a curl-free magnetic vector potential field. Because the generating apparatus and detecting apparatus have directional characteristics, the generating and detecting apparatus must be aligned.

These and other features of the present invention will be understood upon reading of the following description along with the drawings.

BRIEF DESCRIPTION OF THE DRAWINGS

FIG. 7 shows a schematic diagram for apparatus for determining the magnitude of the curl-free magnetic vector potential field for weak fields.

FIG. 8 shows a schematic diagram for apparatus for determining the magnitude of the curl-free magnetic vector potential field for strong fields.

FIG. 9 illustrates the operation of the apparatus determining the magnitude of strong curl-free magnetic vector potential fields.

OPERATION OF THE PREFERRED EMBODIMENT

1. Detailed Description of the Figures

Figure 1:
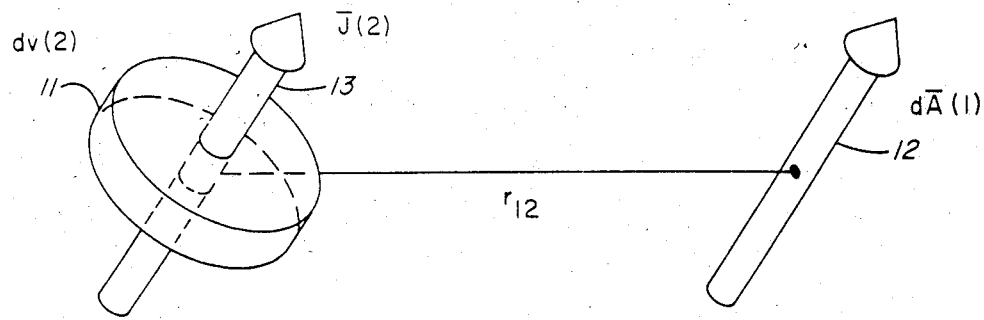
FIG. 1 is a schematic diagram illustrating the procedure for determining a magnetic vector potential at a point.

Referring to FIG. 1, the method of determining the magnetic vector potential field $\overline{A}(1)$ 12 (i.e., at point 1) is illustrated. Referring to equation 6, the contribution by the differential volume element at point 2, dv(2), 11, having a current density $\overline{J}(2)$ 13 associated therewith is given by $$d\overline{A}(1) = \frac{1}{4\pi\epsilon_0 C^2} \frac{\overline{J}(2)}{r_{12}} dv(2) \qquad 10.$$

To obtain equation 6, equation 10 must be integrated. Equations 6 and 10 are valid where $\overline{J}$ is not a function of time.

Figure 2:
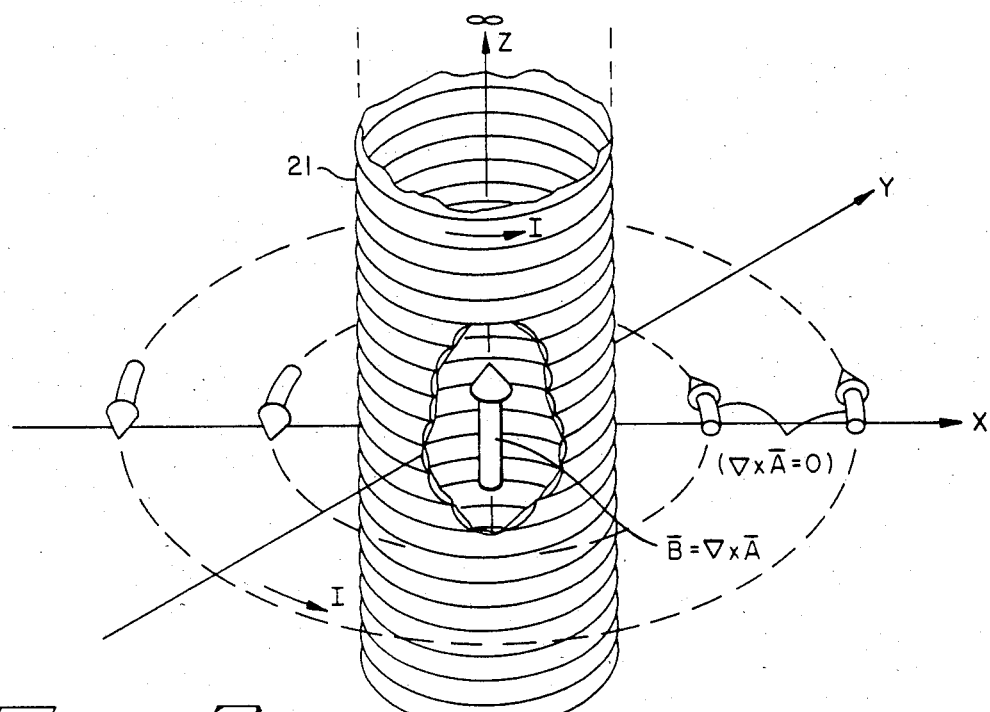
FIG. 2 is a schematic diagram illustrating the generation of a curl-free magnetic vector potential field using an infinite solenoid.

Referring to FIG. 2, an example of current configuration producing a substantial component of curl-free magnetic vector potential field is shown. Conductors carrying a current I are wrapped in a solenoidal configuration 21 extending a relatively great distance in both directions along the z-axis. With the solenoid 21 the magnetic flux density $\overline{B}$=CURL $\overline{A}$, is a constant directed along the z-axis with a value $$\overline{B} = B_z = \frac{nI}{\epsilon_0 C^2} \qquad 11.$$

where n is the number of conductor turns per unit length. Outside of the solenoid, it can be shown that the components of $\overline{A}$ in the x-y plane are, $$A_x = -\frac{nIa^2}{2\epsilon_o C^2} \frac{y}{x^2 + y^2} \qquad 12.$$

$$A_y = \frac{nIa^2}{2\epsilon_o C^2} \frac{x}{x^2 + y^2} \qquad 13.$$

$$A_z = 0 \qquad 14.$$

where a is the radius of the solenoid. It can be shown that CURL $\overline{A}=0$ for the magnetic vector potential field outside of the solenoid 21. To the extent that the solenoid is not infinite along the z-axis, dipole terms (i.e., CURL $\overline{A}=0$) will be introduced in the magnetic vector potential field.

Figure 3:
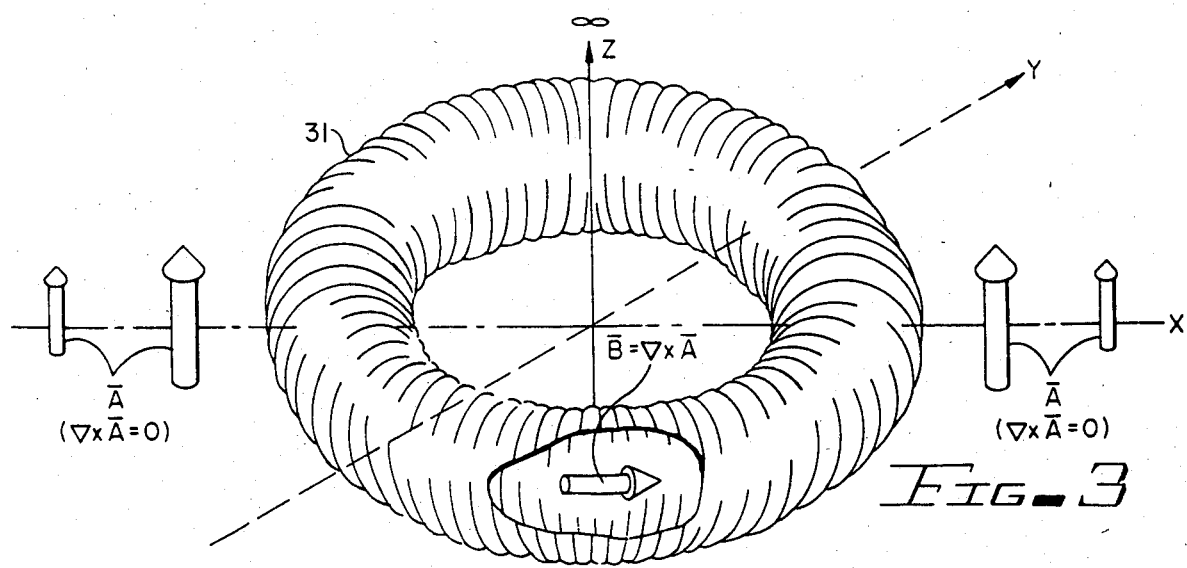
FIG. 3 is a schematic diagram illustrating the generation of a curl-free magnetic vector potential field using a toroidal configuration.

Referring to FIG. 3, another example of a current geometry generating magnetic vector potential field with a substantial curl-free component is shown. In this geometry the current carrying conductors are wrapped uniformly in toroidal configuration 31. Within the toroidal configuration, the magnetic flux, $\overline{B}=$ CURL $\overline{A}$ and the magnetic flux, is contained substantially within the torus. In the region external to the torus, $\overline{B}=$ CURL $\overline{A}=0$ and the orientation of the magnetic vector potential field in the plane of the torus is parallel to the axis of the torus.

Figure 4A:
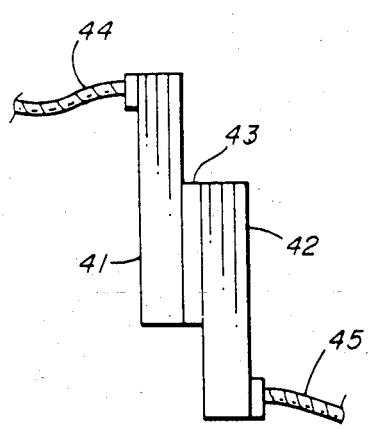
FIG. 4a is a cross-sectional diagram of a Josephson junction.
Figure 4B:
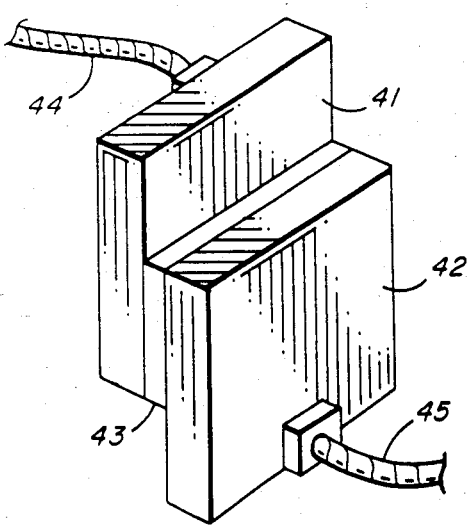
FIG. 4b is a perspective view of a Josephson junction.

Referring to FIG. 4a and FIG. 4b, the schematic diagram, a detector capable of detecting the curl-free component of the magnetic vector potential field is shown. This detector is referred to as a Josephson junction device. The Josephson junction consists of a first superconducting material 41 and a second superconducting material 42. These two superconducting materials are separated by a thin insulating material 43. According to classical electromagnetic theory, the insulating material 43 will prevent any substantial conduction of electrons between the two superconducting regions. However, quantum theory predicts, and experiments verify that conduction can take place through the insulating material. The result of this conduction is a net current $$I_{JJ} = K \sin\left(\delta_o + \frac{\partial e}{h} \int \overline{A} \cdot d\overline{s} + \frac{e}{h} Vt\right) \qquad 15.$$

where the magnitude of the current K and the phase $\delta_o$ are determined by intrinsic properties of the junction device, e is the charge of the electron, $\overline{A}$ is an externally applied magnetic vector potential, $d\overline{s}$ is a differential element extending from one superconducting element to the other superconducting element, t is time, and V is an externally applied voltage. This conduction takes place when leads 44 and 45 are coupled with very low impedance to the current flow. The component of the magnetic vector potential field perpendicular to the plane of the junction determines the current $I_{JJ}$.

Figure 5:
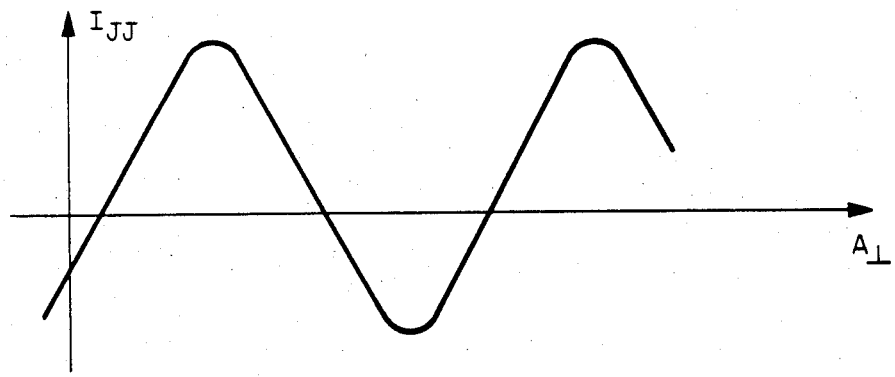
FIG. 5 is a diagram of the current flowing in a Josephson junction as a function of the magnetic vector potential field perpendicular to the plane of the junction.

Referring to FIG. 5, the relationship of the Josephson junction device current as a function of externally applied magnetic vector potential field is shown. Referring to Equation 15, the integral $\int \overline{A} \cdot d\overline{s}$, as $\overline{A}$ is increased, results in a change of phase for $I_{JJ}$. This change in phase produces the oscillating behavior for $I_{JJ}$ as a function of magnetic vector potential field perpendicular to the Josephson junction. This relationship will hold as long as there is no externally applied voltage to the Josephson junction (i.e., V=0).

Figure 6:
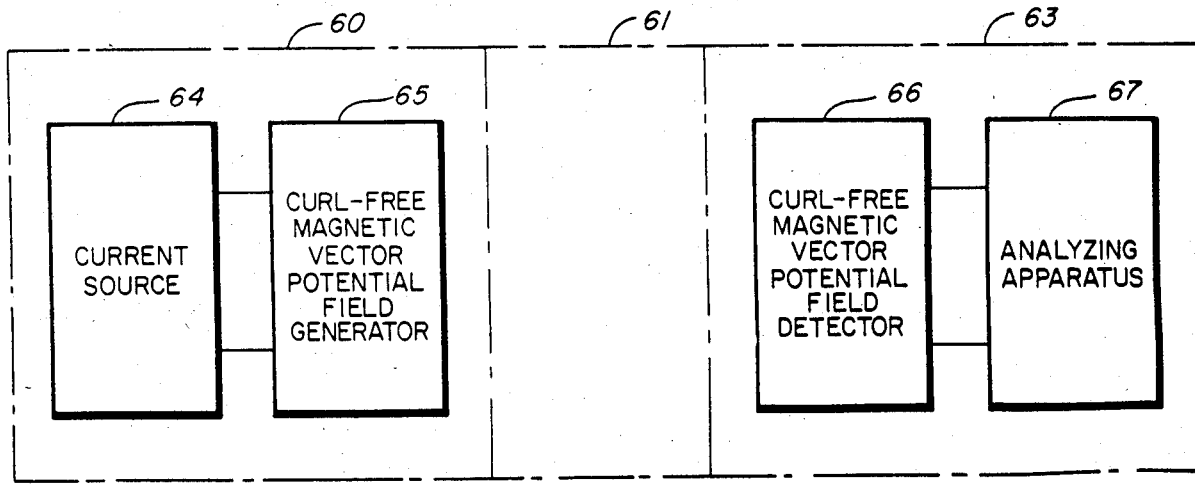
FIG. 6 is a schematic diagram of a system for using a curl-free vector potential radiation field for transmissions of information.

Referring next to FIG. 6, a system for the determination of distance using a curl-free vector potential field is shown. Apparatus 60 is comprised of a current source 64 and apparatus 65 configured to generate a magnetic vector potential field having a substantial curl-free component using the current from the current source. The magnetic vector potential field is established in the intervening media 61 and impinges upon a magnetic vector potential field detector 66. The property of detector 66 indicating the presence of a magnetic vector potential field is analyzed in apparatus 67 to determine the magnitude of the field.

Referring next to FIG. 7, a method of determining the strength of the magnetic vector potential field applied to the Josephson junction is shown. As the magnetic vector potential field A changes, the phase of the Josephson junction current $I_{JJ}$ in conductor 73 will change causing the voltage applied to the analog-to-digital converter 79 to change. The analog-to-digital converter provides a digital representation of $I_{JJ}$ which is convenient for storage and for analysis. The output of the analog-to-digital converter 79 is applied to storage, analyzer and display device 78. Thus any change in $I_{JJ}$ will be recorded in device 78.

Referring next to FIG. 8, when a magnetic vector potential field A 71 of sufficient strength is applied to the Josephson junction 66, the Josephson junction current will experience a multiple of oscillations. In this situation, it can be more convenient to use digital techniques. The signal from transfer means 74 is applied to amplifier 91. The overdriven amplifier 91 converts the oscillating signal to a series of square waves. The square wave signal is applied to differentiating circuit 92. The output signal of the differentiating circuit comprising a series of pulses is applied to counter 93, and the output signal of counter 93 is applied to storage, analyzer and display device 88.

Referring to FIG. 9, the output signals of the various components of the apparatus illustrated in FIG. 8 are shown for a period of change of the curl-free magnetic field component perpendicular to the plane of the Josephson junction. Components of $A_\perp$ field generated by a source of magnetic vector potential field generator 65 are shown by functions 111, 112 and 113. Each generated field has a $A_\perp$ component 115 which is a function of time. This period of time 114 is expanded for the remainder of the indicated time periods. For ease of illustration, changing $A_\perp$ component 115 is shown to be linear over time period 114. Therefore, during time period 114, $I_{JJ}$ will have a component with sinusoidal periodicity, this sinusoidal component will be transferred via apparatus 74 to amplifier 91. Overdrive amplifier 91 will have a periodic square-wave output signal. The square-wave will be applied to the differentiating circuit 93 and the output signal of the differentiating circuit shown in FIG. 9 will be a series of pulses during time period 114. While the change in $A_\perp$ has been assumed to be linear with time, non-linear changes will also produce a pulse train, but as will be clear, this pulse train is no longer periodic. Counter circuit 93 will count the pulses and storage analyzer and display circuit will determine what counts to display. It will be clear in the example shown in FIG. 9 that the count will be displayed during a period of a relatively constant $A_\perp$ component and will recycle when a series of counts is being generated by counter 93. It will be clear that the number of counts in device 88 will depend, for a given change in the field only, on the magnitude of the change.

2. Operation of the Preferred Embodiment

In order to determine a distance, it is necessary in general to provide a predetermined change in the curl-free vector potential field. No mention has been made in the previous discussion of the effect of varying the current source. It will be clear, however, that the finite field propagation velocity will cause a delay between a change in the curl-free magnetic vector potential field produced by the generator of the field and the detection of that change by the detector located at a distance from the generator. However, these delay effects are not important for practicing this invention and will be ignored in this discussion. With respect to curl-free vector potential field generating apparatus, any limitation on the upper limit of generated frequency components imposed will be the result of parameters impacting rapid changes in the current. Thus parameters such as inductance can provide a limit to ability to impose high frequency modulation on the vector potential field.

With respect to the media between the field generating apparatus and the field detecting apparatus, two effects are important. First as implied by equation (1)

$$CURL\ \overline{E} + \frac{\partial \overline{B}}{\partial t} = CURL\ \overline{E} + CURL\ \frac{\partial \overline{A}}{\partial t} = CURL\left(\overline{E} + \frac{\partial \overline{A}}{\partial t}\right) = 0 \qquad 16.$$

or $$\frac{\partial \overline{A}}{\partial t} = -E \qquad 17.$$

Therefore, as modulation is imposed on the vector potential field, the change in the vector potential field will produce an electric field intensity. The electric field intensity will produce a flow of current in conducting material or a temporary polarization in polarizable material. With respect to materials demonstrating magnetic properties, the bulk magnetic properties are responsive to the magnetic flux density $\overline{B}$. However, $\overline{B} = CURL\ \overline{A} = 0$ for the curl-free vector potential field component. Therefore, the interaction of the curl-free magnetic vector potential field is weaker in magnetic materials than is true for the general magnetic vector potential field. Media effects and especially the conductivity of the intervening media will provide a mechanism delaying the achievement of steady state condition for the curl-free magnetic vector potential field $$\left(\text{i.e., because } \frac{\partial \overline{A}}{\partial t} = -\overline{E}\right)$$

thus causing a media limitation on frequency. A curl-free magnetic vector potential field can be established in materials that are not capable of transmitting normal electromagnetic radiation. The media delay problem can be compensated for by lowering the frequency spectrum of the modulation on the curl-free magnetic vector potential field.

With respect to the detector, the Josephson junction can be constructed to provide responses of sufficiently high frequency so that this element of the system is not typically a factor limiting frequency of information.

As indicated in equation 15, the effect of the application of a vector potential field to a Josephson junction, in the absence of a voltage applied to the junction, is to change the phase of the sine function determining the value of the junction current $I_{JJ}$. The excursions form zero magnetic vector potential field can be analyzed and a determination made of the modulation applied to the field. When a voltage is applied to the Josephson junction, oscillation occurs in the $I_{JJ}$ as will be seen from the Vdt term of equation 12. The application of an external vector potential field causes the phase of the oscillation to change. By monitoring the phase change in the Josephson junction oscillations, the the modulation of the vector potential field can be inferred.

Another method of detection of a magnetic vector potential field utilizes the property that $$\frac{\partial \overline{A}}{\partial t} = -\overline{E}.$$

Thus, for example, by measuring the changes in a material resulting from the application of the electric field, the magnetic vector potential field causing the electric field can be inferred.

In order to determine distance using the present invention, it is necessary to calibrate the output signal of the detecting apparatus as a function of distance and as a function of field magnitude for field produced by magnetic vector potential field generating apparatus. Although the calibration can be done theoretically, it is generally more convenient to calibrate the detecting apparatus experimentally. However, two related problems can arise. First, the apparatus generating the curl-free magnetic vector potential field is highly directional, e.g., the field resulting from the finite solenoid has a maximum value in the plane through the center of the solenoid. In addition, the Josephson junction is also directional. Thus it is necessary to orient the generating apparatus and Josephson junction apparatus during a distance measurement. A plurality of Josephson junctions can be used in the detecting apparatus and the detecting apparatus output signal can be the vector sum of the individual output signal of apparatus associated with the plurality of Josephson junction. This procedure eliminates the requirement of the rotation of the Josephson junction device, but orientation of the generating apparatus can still be required. After the detecting apparatus is calibrated with predetermined generating apparatus signals the detecting apparatus can be placed at an unknown distance, (i.e., in sea water) from the generating apparatus. The generating apparatus can be rotated slowly emitting a predetermined signal and the detecting apparatus can use the optimum signals for the actual measurement of the distance. Because of the directionality of the curl-free magnetic field, it will be clear that rotating the field generating apparatus can result in modulation which can be used in the measurement.

Many changes and modifications in the above-described embodiment of the invention can, of course, be carried out without departing from the scope thereof. Accordingly, the scope of the invention is intended to be limited only by the scope of the accompanying claims.

What is claimed is:

1. A method for determining distance between a radiation transmitting apparatus and a radiation detection apparatus comprising the steps of:
    a. generating a curl-free magnetic vector potential field having preselected characteristics by said transmitting apparatus;
    b. calibrating output signals generated by said detection apparatus in response to detection of a magnetic vector potential field having predetermined characteristics as a function of distance between radiation transmitting apparatus and said radiation detecting apparatus; and
    c. measuring an output signal of said detecting apparatus when said transmitting apparatus is generating a curl-free magnetic vector potential field with said preselected characteristics at an unknown distance from said receiving apparatus, said unknown distance being determined by comparison of said output signal resulting from a curl-free magnetic vector potential field having said predetermined characteristics and said output signal resulting from a curl-free magnetic vector potential field having said preselected characteristics, wherein said predetermined characteristics and said preselected characteristics have a known relationship.

2. The method for determining distance of claim 1 wherein said transmitting apparatus and said detecting apparatus are aligned to produce a maximum output signal by said detecting apparatus.

3. Apparatus for determining a distance between a first location and a second location comprising:
    means for generating a radiation field having a substantial curl-free magnetic vector potential field component with predetermined characteristics, said means for generating a radiation field located at said first location;
    means for determining a magnitude of a curl-free magnetic vector potential field component generated by said means for generating a radiation field, said means for determining a magnitude of a curl-free magnetic vector potential field component located at said second location, said means for determining a magnitude responsive to said predetermined characteristics for determining a quantity having a known relationship to said curl-free magnetic vector potential field magnitude; and
    a reference field generating means for providing a curl-free magnetic vector potential field having known characteristics, wherein said reference field generating means is used to calibrate said means for determining a magnitude, said curl-free magnetic vector potential fields generated by said reference field generating means and said means for generating a radiation field have a predetermined relationship 4. The apparatus of claim 3 wherein said field generating means and said field magnitude determining means are oriented to provide a maximum field magnitude by said field magnitude determining means.

5. The apparatus of claim 3 wherein said curl-free magnetic potential field magnitude determining means includes a Josephson junction device.

6. The apparatus of claim 5 wherein said curl-free magnetic potential field determining means includes apparatus for determining a quantity proportional to a phase shift of said Josephson junction device resulting from said curl-free magnetic potential field, said phase shift being determined by a change in amplitude of said curl-free magnetic vector potential field interacting with said Josephson junction.

7. Apparatus for measuring a distance to a transmitter generating radiation having a curl-free magnetic vector potential component with predetermined characteristics comprising:
    receiver for detecting curl-free magnetic vector potential radiation;
    said receiver including apparatus for generating an output signal having a known relationship to a change in said detected curl-free magnetic vector potential radiation; and
    source apparatus transmitting curl-free magnetic vector potential radiation having pre-established characteristics, said source apparatus used to calibrate said receiver by providing a known change in said curl-free magnetic vector potential field when said receiver is at a known distance from said source apparatus, wherein said predetermined characteristics has a known relationship to said pre-established characteristics.

8. Apparatus for measuring a distance from a transmitter generating radiation with a curl-free magnetic vector potential component having predetermined characteristics, comprising:
    detection means for detecting curl-free magnetic vector potential field, said detection means providing an intermediate signal, said intermediate signal varying in a pre-established manner with a one of said predetermined characteristics of said transmitter radiation; and
    analyzing means adapted to receive said intermediate signal, said analyzing means providing an output signal related to said one predetermined characteristic, said output signal being calibrated by application of a curl-free magnetic vector potential component having a known relationship to said transmitter curl-free magnetic vector potential.

9. The distance measuring apparatus of claim 7 wherein said detection means is a Josephson effect device.